(12) United States Patent
Lim et al.

(10) Patent No.: US 7,710,971 B2
(45) Date of Patent: May 4, 2010

(54) METHOD OF BLOCKING NETWORK ATTACKS USING PACKET INFORMATION AND APPARATUS THEREOF

(75) Inventors: Jae Deok Lim, Daejeon (KR); Young Ho Kim, Daejeon (KR); Seung Ho Ryu, Seoul (KR); Bo Heung Chung, Daejeon (KR); Ki Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 778 days.

(21) Appl. No.: 11/592,136

(22) Filed: Nov. 3, 2006

(65) Prior Publication Data

US 2007/0110069 A1    May 17, 2007

(30) Foreign Application Priority Data

Nov. 12, 2005    (KR)    .............. 10-2005-0108290

(51) Int. Cl.
*H04L 12/56*    (2006.01)
(52) U.S. Cl. ..................... 370/392; 370/401
(58) Field of Classification Search ........... 370/230, 370/254, 255, 389, 392, 401
See application file for complete search history.

(56) References Cited

U.S. PATENT DOCUMENTS 7,043,247 B2 *   5/2006   Chitrapu ............ 455/445
7,246,173 B2 *   7/2007   Le et al. ............. 709/238
2006/0080728 A1 *   4/2006   Wen et al. ........... 726/4

FOREIGN PATENT DOCUMENTS

KR   2000-0072707   12/2000

* cited by examiner

*Primary Examiner*—Hong Cho
(74) *Attorney, Agent, or Firm*—Lowe Hauptman Ham & Berner, LLP

(57) ABSTRACT

A method of blocking network attacks using information included in a packet, and an apparatus thereof are provided. The method includes: receiving a packet containing information on the packet including at least information on a source from which the packet is sent, and information on a destination to which the packet is sent; and extracting the information on the packet included in the packet, comparing the information with a predetermined access control condition, and blocking or passing the packet. By doing so, a packet being transferred with a routing header capable of bypassing a security device as in an Internet Protocol version 6 (IPv6) network can be appropriately blocked or passed. Accordingly, security problems caused by the routing header can be overcome, and as a result, usage of the routing header can be promoted. Also, since a routing header can be used for transmitting a packet along a desired path, the routing header can be widely used without security problems, and can ease network security concerns relating to IPv6 networks that are expected to come into increasingly wide use.

6 Claims, 5 Drawing Sheets

METHOD OF BLOCKING NETWORK ATTACKS USING PACKET INFORMATION AND APPARATUS THEREOF

CROSS-REFERENCE TO RELATED PATENT APPLICATIONS

This application claims the benefit of Korean Patent Application No. 10-2005-0108290, filed on Nov. 12, 2005, in the Korean Intellectual Property Office, the disclosure of which is incorporated herein in its entirety by reference.

BACKGROUND OF THE INVENTION

1. Field of the Invention

The present invention relates to network security, and more particularly, to a method of blocking network attacks using information included in a packet, and an apparatus thereof.

2. Description of the Related Art

A firewall, which is used to prevent illegal access through a network, determines whether to block or allow packets, based on the source and destination addresses of a packet Internet Protocol (IP) header transmitted through a network. In the conventional Internet Protocol version 4 (IPv4) environment, this method is generally used.

However, Internet Protocol version 6 (IPv6) networks in the new IPv6 environment have a variety of features. Among these features, a weakness against a bypass attack using a routing header is a problem that necessarily needs to be solved.

That is, in the IPv6 network environment, preventing illegal access using the conventional method may not be possible, because a routing header may be used to enable access to a system protected by a firewall in the IPv6 network environment.

The routing header is a type of extension header that is a new structure of IPv6 networks, and provides a function allowing an IP packet to pass a desired system, by a user specifying an arbitrary system through which the IP packet is desired to pass, in the routing header. However, this function has a security weakness point allowing a packet to access a system to which access is restricted, by bypassing a blocking function of a firewall that is an access control function.

The routing header is a feature unique to IPv6 networks, used by a packet to specify one or more intermediate nodes through which the packet is desired to be transmitted, so that the packet can be transmitted through the nodes. If this feature is used, an ordinary security device that blocks a harmful packet, by using a source address and a destination address, can be bypassed. Since IPv6 networks and security devices therefor have not been generally used yet, the known security weakness problem as described above has not yet been overcome.

SUMMARY OF THE INVENTION

The present invention provides a method of blocking a network attack, by using information included in a packet, by which a security weakness problem whereby an access control list of a security device is bypassed and a protected system is accessed with a routing header in which a packet specifies intermediate nodes and is transferred through the intermediate nodes, can be overcome, and an apparatus for the method.

According to an aspect of the present invention, there is provided a method of blocking a network attack using information included in a packet, the method including: receiving a packet containing information on the packet including at least information on a source from which the packet is sent, and information on a destination to which the packet is sent; and extracting the information on the packet included in the packet, comparing the information with a predetermined access control condition, and blocking or passing the packet.

The information on the received packet may include a routing header specifying intermediate nodes through which the packet is transferred, so that the packet is transferred through the intermediate nodes, and in the blocking or passing of the packet, the packet access control condition to block or pass the packet may include a condition determined with including at least the source information, destination information, and routing header information of the packet.

The packet may be a packet transferred through an IPv6 (Internet Protocol version 6) network, and the information on the packet is included in a header of the packet.

According to another aspect of the present invention, there is provided an apparatus for blocking a network attack using information included in a packet, the apparatus including: a packet reception unit receiving a packet containing information on the packet including information on a source from which the packet is sent, information on a destination to which the packet is sent, and a routing header specifying intermediate nodes through which the packet is transmitted, so that the packet can be transmitted through the intermediate nodes; a packet information extraction unit extracting the information on the packet from the received packet; an access control list including and storing a predetermined condition to block or pass a packet according to the source information, destination information and routing header information of the packet; and a packet processing unit comparing the source information, destination information and routing header of the packet included in the extracted information on the packet, with the condition of the access control list to block or pass the packet.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
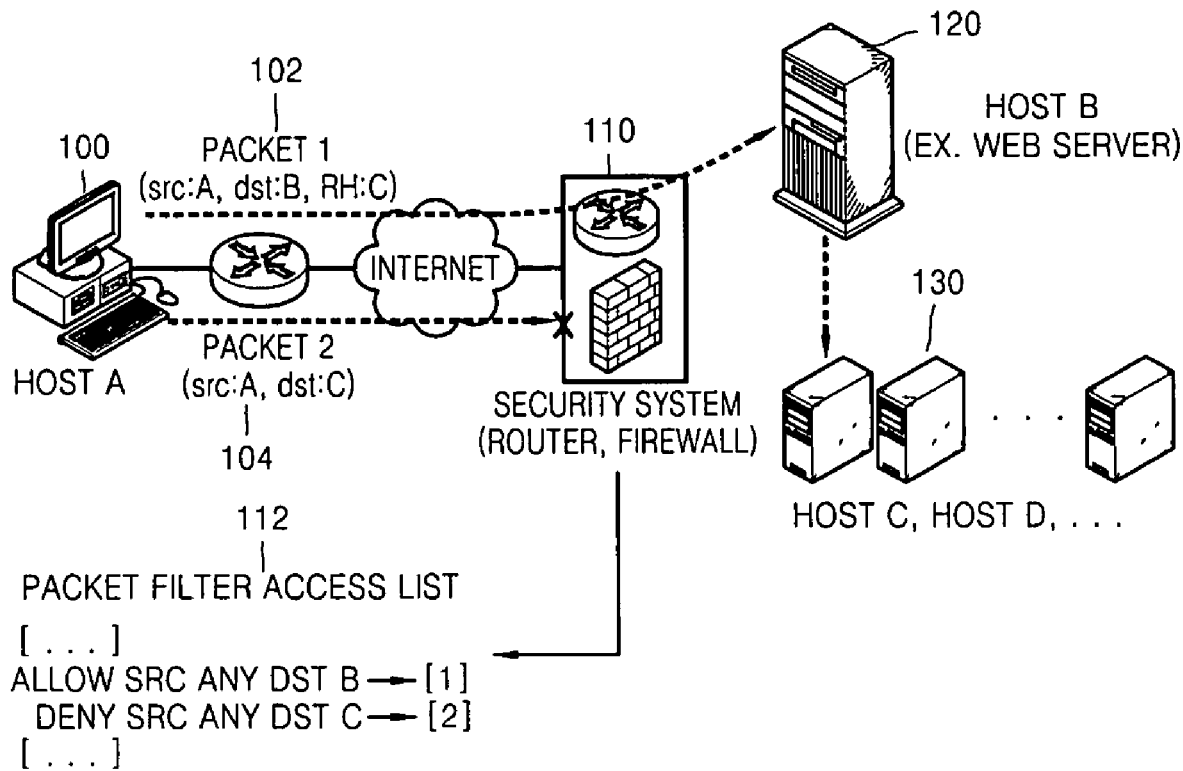
FIG. 1 illustrates an example of an attack bypassing a firewall using a routing header in an Internet Protocol version 6 (IPv6) network environment.

FIG. 1 illustrates an example of an attack bypassing a firewall using a routing header in an Internet Protocol version 6 (IPv6) network environment.

Generally, a network including an IPv6 network is constructed as illustrated in FIG. 1.

In order to prevent intrusion from the outside, the network of FIG. 1, including hosts 120 and 130, protects networks included therein with a security system 110, such as a router and a firewall. In this case, a host A 100 and other external systems can access the hosts 120 or 130 through the Internet.

Here, the network of FIG. 1, including the hosts 120 and 130, is composed of a plurality of systems that can be accessed only inside the network. The host 120 may be a web server for web services. Also, the security system 110 of the network protects the internal systems such as the hosts 130 according to an access control criterion included in an access control list (packet filter access list) 112.

In the contents of the access control list 112, the host 120 can be accessed from the outside according to condition [1] (allow src any dst B), and the hosts 130 are set to deny access from the outside according to condition [2] (deny src any dst C).

Generally, the structure of the access control list includes a protocol and ports, as well as a source address and a destination address, but for convenience of explanation, only addresses will be explained as examples.

Access by packet 2 104 is blocked according to the access control criterion of the access control list of the security system 110. However, in the case of packet 1 102, if an intermediate path includes host B 120 even if the destination is host C 130, packet 1 102 cannot be blocked by the conventional access control list.

First, packet 1 102 accesses host B 120 that is set as one address included in the intermediate path, and the security system 110 passes packet 1 102 because access from the outside to host B 120 is permitted. However, host B 120 learns the presence of a routing header (RH) and learns that the final destination of packet 1 102 is not host B 120 itself, and transfers packet 1 102 to host C 130 specified in the routing header. As a result, the packet 1 102 from the outside is transferred to host C 130 to which access from the outside is prohibited. Thus, an unwanted situation in which through a system that can be accessed from the outside, another system to which access from the outside is prohibited is accessed occurs.

The function of the routing header providing this function is defined in a request for comments (RFC) standard document that obtains information from the Internet such as procedures and formats when a network protocol or service is implemented. Accordingly, as it is highly probable that the routing header is used in the IPv6 network environment, the security weakness problem of the routing header should be addressed.

Figure 2:
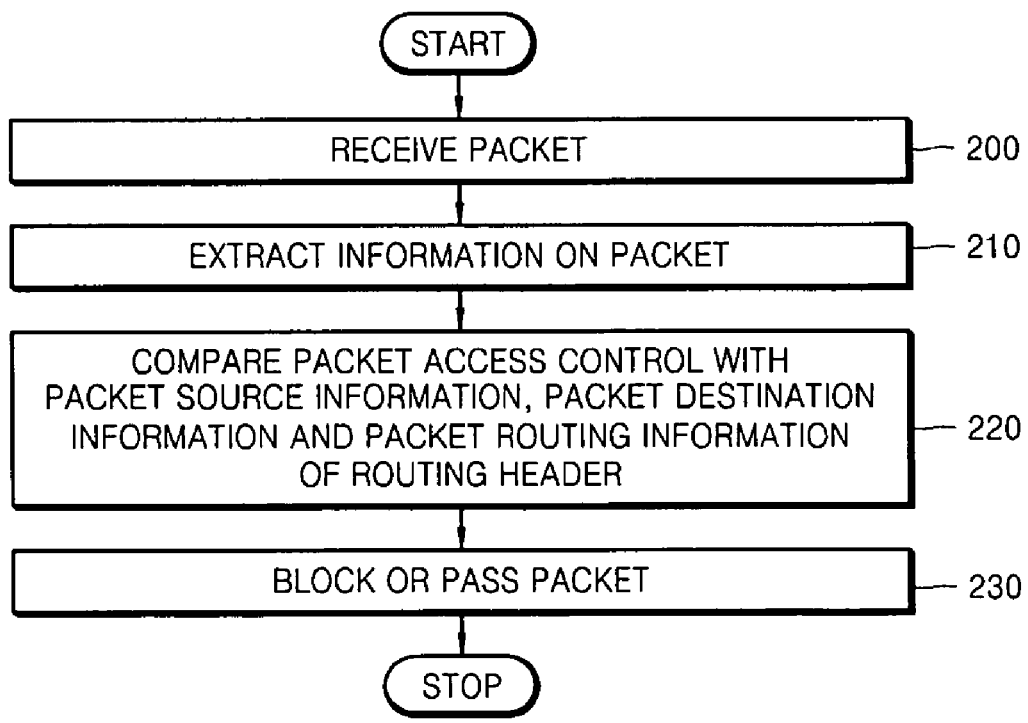
FIG. 2 is a flowchart illustrating a method of blocking a network attack using information included in a packet, according to an embodiment of the present invention.

FIG. 2 is a flowchart illustrating a method of blocking a network attack using information included in a packet, according to an embodiment of the present invention.

A packet containing information on the packet including at least information on a source from which the packet is sent, and information on a destination to which the packet is sent is received in operation 200. Information on the packet is extracted from the received packet in operation 210. The information is compared with a packet access control condition based on the packet source information, packet destination information and a routing header in operation 220. According to the comparison result, the packet is blocked or passed in operation 230.

Figure 3:
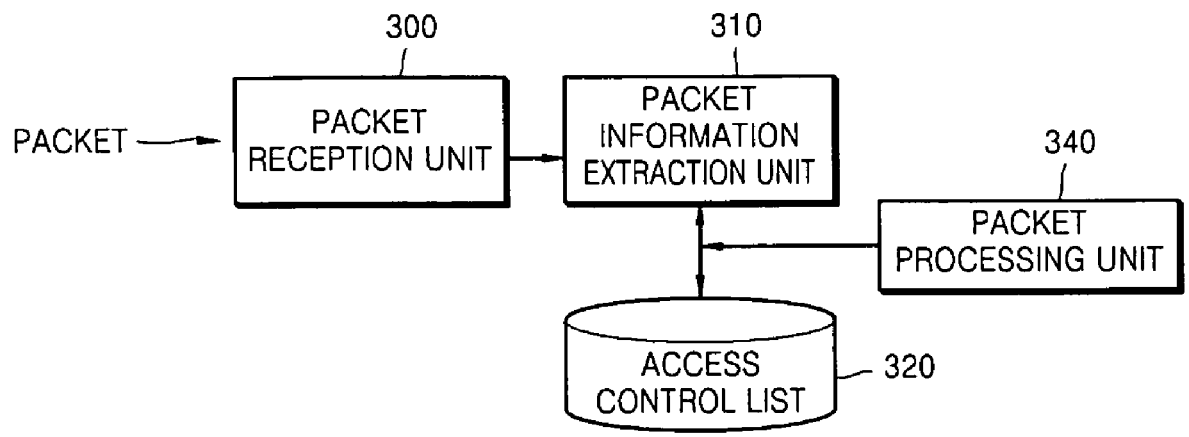
FIG. 3 is a block diagram of a structure of an apparatus for blocking a network attack using information included in a packet, according to an embodiment of the present invention.

FIG. 3 is a block diagram of a structure of an apparatus for blocking a network attack using information included in a packet, according to an embodiment of the present invention. This apparatus executes the method of FIG. 2.

Referring to FIG. 3, the apparatus includes: a packet reception unit 300 receiving a packet containing information on the packet including information on a source from which the packet is sent, information on a destination to which the packet is sent, and a routing header specifying intermediate nodes through which the packet is transmitted, so that the packet can be transmitted through the intermediate nodes; a packet information extraction unit 310 extracting the information on the packet from the received packet; an access control list 320 including and storing a predetermined condition to block or pass a packet according to the source information, destination information and routing header information of the packet; and a packet processing unit 340 comparing the source information, destination information and routing header of the packet included in the extracted information on the packet, with the condition of the access control list 320 to block or pass the packet.

At this time, the packet received by the packet reception unit 300 is a packet transferred through an IPv6 network, and the extraction of information on the packet by the packet information extraction unit 310 comprises extracting information included in the header of the transferred packet.

Also, the packet processing unit 340 determines to block or pass the packet, by comparing the source and destination information of the packet included in the information on the packet extracted by the packet information extraction unit 310, with the blocking or passing criterion with respect to source and destination included in the access control list 320.

First, the packet processing unit 340 determines to block or pass the packet, by comparing the source and destination information of the packet included in the information on the packet, with the blocking or passing criterion with respect to source and destination included in the packet access control condition of the access control list 320. If a routing header is included in the information on the packet, the packet processing unit 340 determines to block or pass the packet, by comparing the source and routing header information of the packet included in the information with the blocking or passing criterion with respect to source and destination included in the packet access control condition.

If a plurality of routing headers are included in the information on the packet, the comparison with the packet access control condition is performed with one routing header, and then the remaining routing headers are sequentially used for the comparison with the packet access control condition in the same manner so as to determine to block or pass the packet.

Figure 4A:
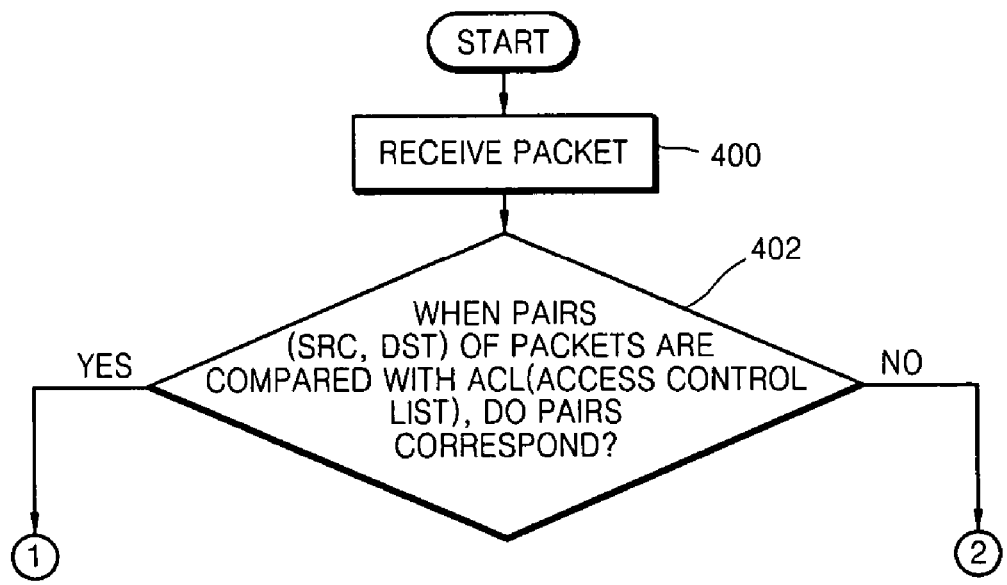
FIGS. 4A through 4C are detailed flowcharts illustrating a method of blocking a network attack using information included in a packet, according to an embodiment of the present invention.
Figure 4B:
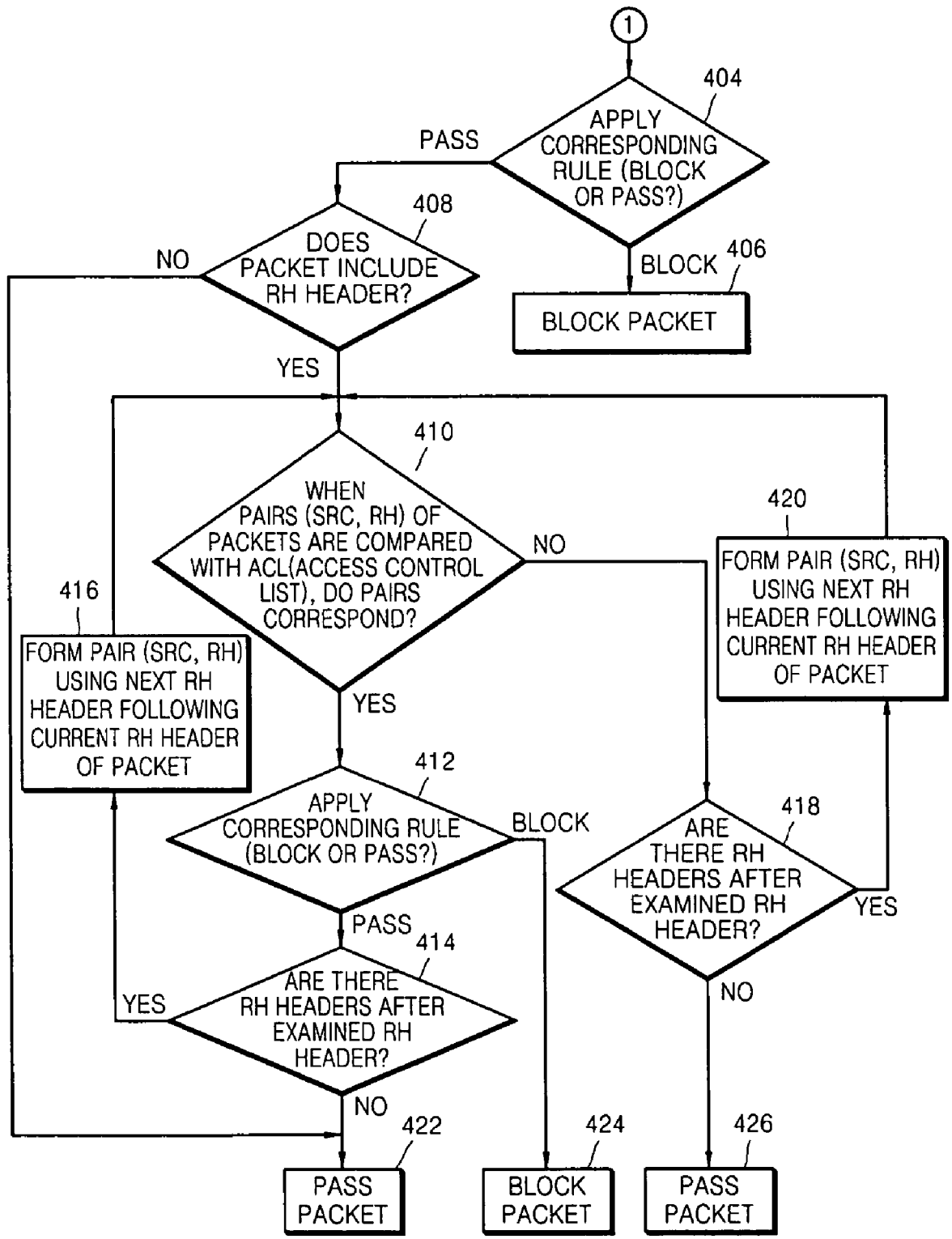
Figure 4C:
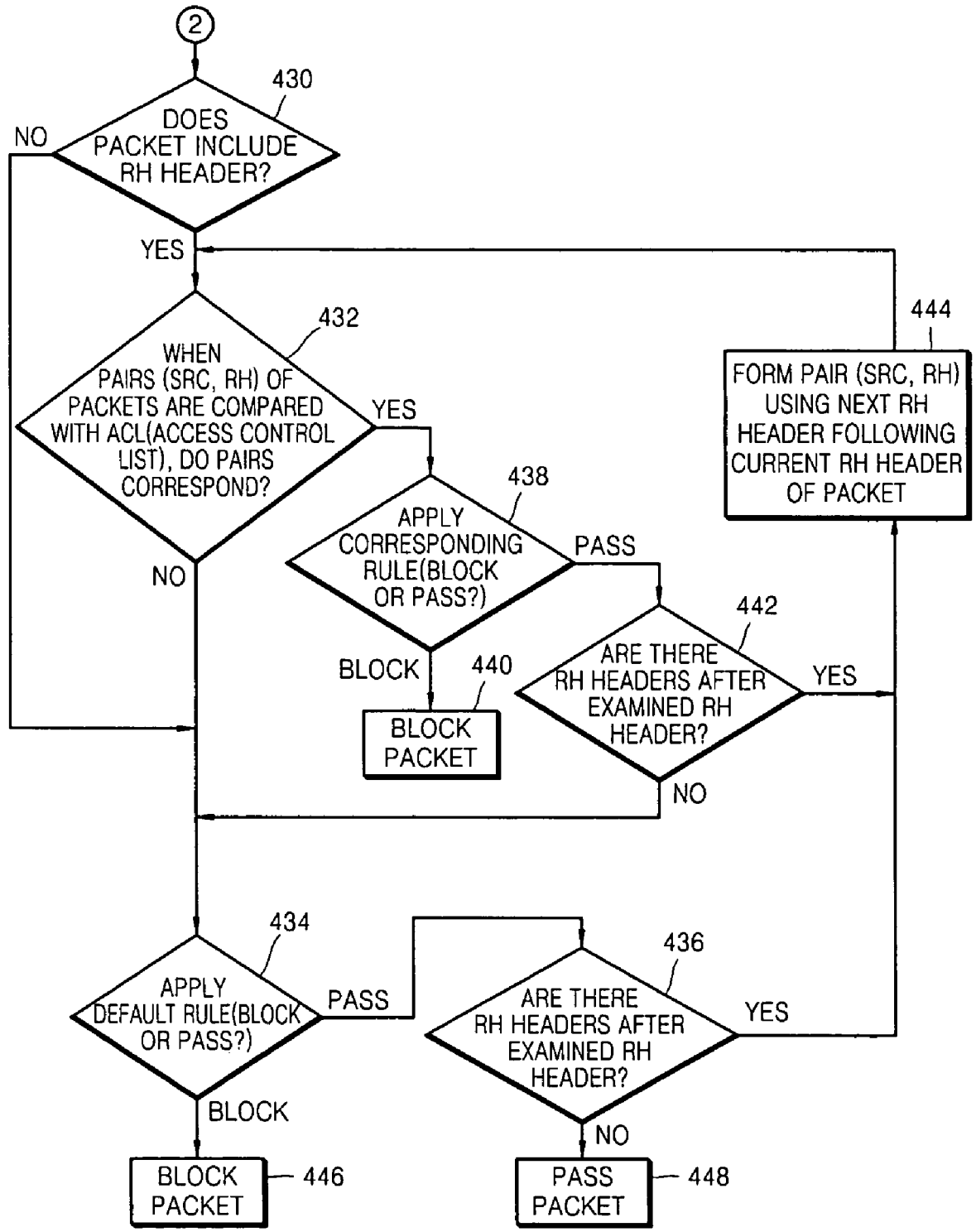

FIGS. 4A through 4C are detailed flowcharts illustrating a method of blocking a network attack using information included in a packet, according to an embodiment of the present invention. Detailed operations of embodiments of the present invention as described above will now be explained with reference to FIGS. 4A through 4C.

The conventional technology has a problem that when an access control function to determine whether or not to block a packet through examination of the packet for security is executed a routing header cannot be handled appropriately. To solve this problem, the present invention processes the routing header when an access control function is executed, such that the security weakness problem can be solved.

If a packet is input, the packet reception unit 300 receives the packet in operation 400. At this time, the packet includes information on a source from which the packet is sent, a destination to which the packet is being sent, and a routing header specifying intermediate nodes through which the packet is transmitted, so that the packet can be transmitted through the intermediate nodes, and the network through which the packet is transmitted is an IPv6 network.

The packet information extraction unit 310 extracts information on the packet from the header of the packet received through the packet reception unit 300. The packet processing unit 340 compares the information on the packet with the access control criterion stored in the access control list 320. The access control list 320 includes predetermined conditions to block or pass a packet according to the source information, destination information.

The packet processing unit 340 compares the source address and destination address of the packet defined in the packet access control list with the source address and destination address information of the packet included in the extracted information on the packet, and confirms whether or not a criterion for blocking or passing a packet matches the information in operation 402.

If the packet matches the criterion of the access control list, the packet is processed according to the flowchart illustrated in FIG. 4B, and if the packet does not match the criterion, the packet is processed according to the flowchart illustrated in FIG. 4C.

Since the conventional IPv4 network does not have a routing header, if a received packet matches the control condition of an access control list, the packet can be blocked, passed, or processed according to a predetermined procedure, and if the packet does not match the control condition, the packet can be processed according to a basically defined rule. However, since a special header called a routing header exists in the IPv6 network, and the use of this header may cause a security weakness problem, this problem needs to be addressed.

FIG. 4B shows a flowchart for a case when the information on the received packet matches the condition of the access control list, and the operations performed in the packet processing unit 340 will now be explained.

First, it is confirmed whether the condition set for the packet is to block or to pass the packet in operation 404. If the condition is to block the packet, the packet is blocked in operation 406. If the condition is to pass the packet, the packet is not passed directly, but it is examined and confirmed whether or not a routing header exists in operation 408.

If the packet does not include a routing header, there are no more items to be examined, and the packet is permitted to pass in operation 422. If the packet includes a routing header, the routing is examined as follows.

Since an address in the routing header is also used as a destination address of the packet, a pair of the source address and the address in the routing header, that is a destination address, is examined to determine whether or not the pair matches the condition of the access control list in operation 410. If there is a matching condition in the list, it is determined according to the criterion to block or pass the packet in operation 412. If the condition is to block the packet, the packet is blocked in operation 424, and if the condition is to pass the packet, it is examined in operation 414 whether or not there are more routing headers after the examination of the packet.

If there are no more routing headers, the packet is permitted to pass in operation 422 because there are no more items to be examined. However, if there is another routing header, a pair of a source address and the address in the routing header taken as a destination address is formed in operation 416, and the examination to compare the pair with the criterion of the access control list is again performed in operation 410. Then, the above process is repeated again.

That is, the packet processing unit 340 compares the source and destination information of the packet included in the information on the packet, with the blocking or passing criterion with respect to source and destination included in the packet access control condition and determines first to block or pass the packet. Then, if the information on the packet includes a routing header, the source and routing header information of the packet included in the information on the packet is compared with the blocking or passing criterion with respect to source and destination included in the packet access control condition, and it is secondly determined to block or pass the packet.

If two or more routing headers are included in the information on the packet, the comparison with the packet access control condition is performed with one routing header, and the addresses included in the remaining routing headers are substituted for destination addresses and compared with the packet access control condition in the same manner, and it is determined to block or pass the packet. If there are following headers, by repeating this process for the following routing headers all routing headers are examined.

If there are no conditions matching the information in operation 410, it is determined whether or not there is a following routing header in operation 418. If there are no more routing headers, packet is permitted to pass because there is no more items to be examined in operation 426. However, if there is another routing header, a pair of a source address and the routing header taken as a destination address is formed in operation 420, and the examination to compare the pair with the criterion of the access control list is again performed in operation 410.

FIG. 4C shows a flowchart for a case when the information on the received packet matches the condition of the access control list, and the operations performed in the packet processing unit 340 will now be explained.

If the information on the packet is not specified in the condition of the access control list, it is determined whether or not the packet includes a routing header, before applying a predetermined packet basic rule to the packet in operation 430, and through this, it is determined whether or not the information matches the condition of the access control list.

If the packet does not include a routing header, the packet default rule is applied to determine whether or not the packet is to be blocked in operation 434. If the packet default rule is to block the packet, the packet is blocked in operation 446 and if the packet default rule is to pass the packet, the packet is passed in operation 448. Although it appears in the flowchart of FIG. 4C as if the presence of a routing header is examined again, a case where a routing header is not included is already determined in operation 430, and therefore, the packet is permitted to pass without additional examination of whether or not a routing header is included in operation 436 (Or even though it is examined, there will not be an additional routing header, and the packet will be permitted to pass).

If the packet includes a routing header in operation 430, a pair of a source address and a destination address is formed with an address specified in the routing header as the destination address, and the pair is compared with the criterion of the access control list in operation 432. If the pair does not match the criterion, the default rule is applied in operation 434. If the default rule is to block the packet, the packet is blocked in operation 446, and if the default rule is to pass the packet, it is determined whether or not there are more routing headers after the already examined routing header in operation 436. If there are no more routing headers, the packet is permitted to pass in operation 448, and if there is another routing header, a pair of a source address and a destination address included in the routing header is formed in operation 444, and the process of examining through comparison with the access control list in operation 432 is repeated.

If the information on the packet matches the criterion of the access control list in operation 432, a rule corresponding to this case is applied to determine whether or not to block the packet in operation 438. If the blocking rule is defined, the packet is blocked in operation 440, and if the rule is to pass the packet, it is determined whether or not there is another following router header after the examined routing header in operation 442. If there are no more routing headers, a predetermined basic rule is applied to determine whether or not to block the packet in operation 434. If there is an additional routing header, a pair of a source address and a destination address included in the routing header is formed in operation 444, and the examination of the next routing header is repeated in operation 432.

Through the operations described above, the routing header is examined, such that packets trying to bypass using a routing header can also be blocked.

Figure 5:
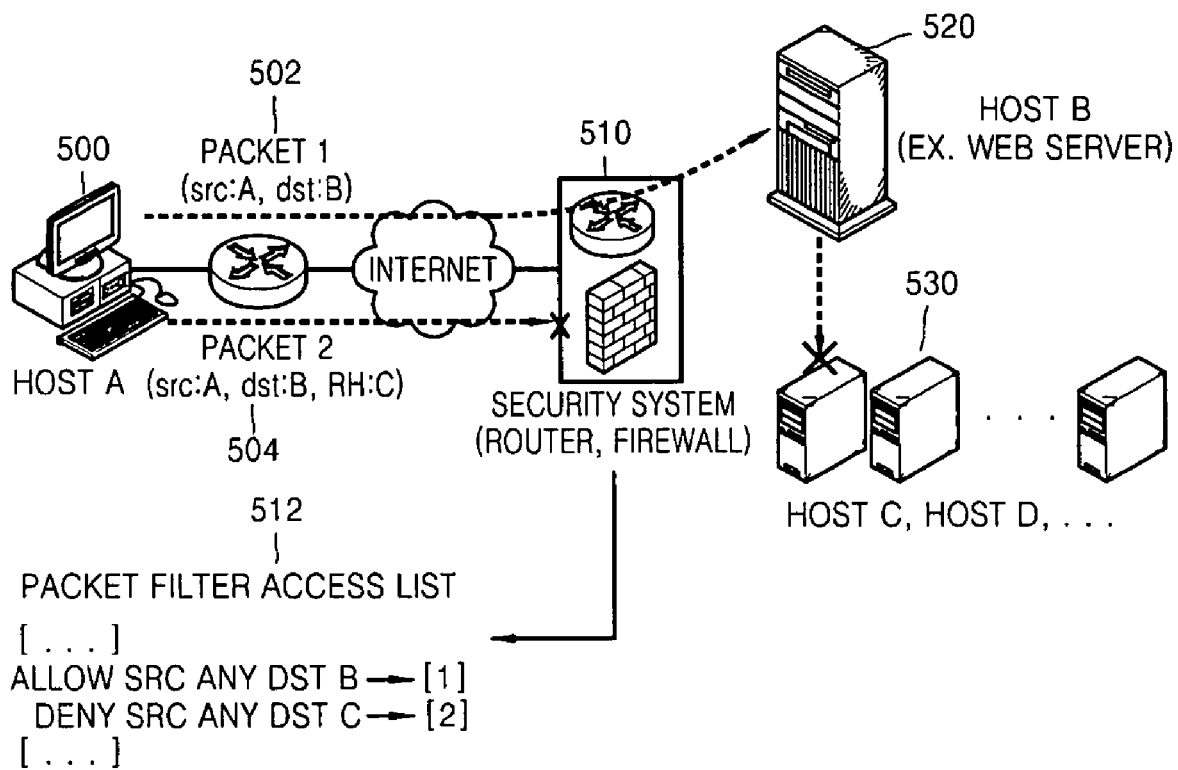
FIG. 5 is a diagram for illustrating how a security device can be used to block a routing header attack, according to an embodiment of the present invention.

FIG. 5 is a diagram for illustrating how a security device can be used to block a routing header attack, according to an embodiment of the present invention.

The structural environment of the system of FIG. 5 is similar to that of FIG. 1. However, unlike FIG. 1, the present invention is applied to a security system 510 of FIG. 5.

Packet 1 502 is a normal packet that tries to access host B system 520 that can be accessed from the outside. Since packet 1 502 does not include a routing header, its final destination is also host B system 520. According to condition [1] (allow src any dst B) of an access control list 512, packet 1 502 can normally access host B system 520.

Since the ordinary packet blocking function of the conventional technology does not include a function processing a routing header, packet 2 504 first accesses host B system 520 as packet 1 502 does. Then, information of the routing header is referred to and packet 2 504 accesses host C system 530 to which access from the outside is prohibited.

However, since the security system 510 using the packet blocking function to which the present invention is applied can perform processing of a routing header, a packet corresponding to packet 2 504 is blocked. In case of packet 2 504, it is determined first through the source and destination addresses, that rule [1] of the access control list is applied. However, if the use of a routing header is confirmed, the examination is performed again with the routing header. Then, since the source is A and the destination is C that is the address of the routing header, rule [2] of the access control list is applied. In this case, since rule [2] is to block the packet, packet 2 504 is blocked.

When access to an internal system from the outside through a network is desired to be blocked in the structure as illustrated in FIG. 5, if a method or apparatus according to an embodiment of the present invention is applied to the structure of the security system 510, bypass access through a routing header, which has been a known security weakness problem of the IPv6 network, can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. For example, though the Internet is explained as an example of a communication network in the above description, the communication network can also be a public telephone communication network, such as a public switched telephone network (PSTN).

Therefore, the scope of the invention is defined not by the detailed description of the invention but by the appended claims, and all differences within the scope will be construed as being included in the present invention.

Also, it is easily understood by those skilled in the art that each step of the present invention can be implemented in a variety of ways, including by software using a general programming technique, and by hardware.

Partial operations of the present invention can also be embodied as computer readable codes on a computer readable recording medium. The computer readable recording medium is any data storage device that can store data which can be thereafter read by a computer system.

According to the present invention, a packet containing information on the packet including at least information on a source from which the packet is sent, and information on a destination to which the packet is sent is received and the information on the packet included in the packet is extracted. Then, by comparing the information with a predetermined access control condition, the packet can be blocked or passed.

By doing so, a packet being transferred with a routing header capable of bypassing a security device as in an IPv6 network can be appropriately blocked or passed. Accordingly, security problems caused by the routing header can be overcome, and as a result, usage of the routing header can be promoted.

Also, since a routing header can be used for transmitting a packet along a desired path, the routing header can be widely used without security problems, and can ease network security concerns relating to IPv6 networks that are expected to come into increasingly wide use.

What is claimed is:

1. A method of blocking a network attack using information included in a packet, the method comprising:

receiving a packet containing information on the packet comprising at least information on a source from which the packet is sent, and information on a destination to which the packet is sent; and extracting the information on the packet included in the packet, comparing the information with a predetermined access control condition, and blocking or passing the packet;

wherein the information on the received packet comprises a routing header specifying intermediate nodes through which the packet is transferred, so that the packet is transferred through the intermediate nodes;

wherein in the blocking or passing of the packet, the packet access control condition to block or pass the packet comprises a condition determined with comprising at least the source information, destination information, and routing header information of the packet; and wherein, in the blocking or passing of the packet, by comparing the source and destination information of the packet included in the information on the packet with the blocking or passing criterion with respect to source and destination included in the packet access control condition, the blocking or passing of the packet is firstly determined, and if a routing header is included in the information on the packet, by comparing the source and routing header information included in the information on the packet with the blocking or passing criterion with respect to source and destination included in the packet access control condition, the blocking or passing of the packet is secondly determined.

2. The method of claim 1, wherein the packet is a packet transferred through an IPv6 (Internet Protocol version 6) network, and the information on the packet is included in a header of the packet.

3. The method of claim 1, wherein, in the blocking or passing of the packet, by comparing the source and destination information of the packet included in the information on the packet with a blocking or passing criterion with respect to source and destination included in the packet access control condition, the blocking or passing of the packet is determined.

4. The method of claim 1, wherein, if a plurality of routing headers are included in the information on the packet, the comparison with the packet access control condition is performed by using one routing header, and then in the same manner, the comparison with the packet access control condition is sequentially performed using the remaining routing headers, so that the blocking or passing of the packet is determined.

5. An apparatus for blocking a network attack using information included in a packet, the apparatus comprising:

a packet reception unit receiving a packet containing information on the packet comprising information on a source from which the packet is sent, information on a destination to which the packet is sent, and a routing header specifying intermediate nodes through which the packet is transmitted, so that the packet can be transmitted through the intermediate nodes;

a packet information extraction unit extracting the information on the packet from the received packet;

an access control list comprising and storing a predetermined condition to block or pass a packet according to the source information, destination information of the packet; and a packet processing unit comparing the source information, destination information and routing header of the packet included in the extracted information on the packet, with the condition of the access control list to block or pass the packet;

wherein, by comparing the source and destination information of the packet included in the information on the packet with the blocking or passing criterion with respect to source and destination included in the packet access control condition, the packet processing unit firstly determines to block or pass the packet, and then, if a routing header is included in the information on the packet, by comparing the source and routing header information included in the information on the packet with the blocking or passing criterion by source and destination included in the packet access control condition, the packet processing unit secondly determines to block or pass the packet.

6. The apparatus of claim 5, wherein the packet received by the packet reception unit is a packet transmitted through an IPV6 network, and in the extraction of information on the packet by the packet information extraction unit, the information included in the header of the received packet is extracted.

* * * * *